United States Patent [19]

Browne et al.

[11] 4,202,454
[45] May 13, 1980

[54] COUPLER TO CONNECT CONVERTIBLE RAIL-HIGHWAY VEHICLES END TO END

[75] Inventors: Kenneth A. Browne, Lexington; Alan R. Cripe, Richmond, both of Va.; Eugene Hindin, Valley Forge, Pa.

[73] Assignee: Bi-Modal Corporation, Greenwich, Conn.

[21] Appl. No.: 937,479

[22] Filed: Aug. 28, 1978

Related U.S. Application Data

[62] Division of Ser. No. 810,120, Jun. 27, 1977.

[51] Int. Cl.² .................. B60F 5/14; B61D 15/00; B61G 1/02; B61G 5/00
[52] U.S. Cl. .................................. 213/86; 105/3; 105/215 C; 213/200; 280/514; 280/514;515
[58] Field of Search ............... 105/4 R, 3, 215 C; 213/86, 87, 158, 188, 189, 190, 191, 192, 200, 204

[56] References Cited

U.S. PATENT DOCUMENTS

| 415,194 | 11/1889 | Follansbee | 213/86 |
| 1,848,956 | 3/1932 | Koehler | 280/514 X |
| 2,889,785 | 6/1959 | Browne | 105/215 C |
| 2,925,791 | 2/1960 | Browne et al. | 105/215 C |
| 3,002,469 | 10/1961 | Wanner | 105/215 C |
| 3,326,575 | 6/1967 | Shepley | 285/515 X |
| 3,342,141 | 9/1961 | Browne | 105/215 C |
| 3,542,400 | 11/1970 | Mason, Jr. | 280/515 X |

Primary Examiner—Joseph F. Peters, Jr.
Assistant Examiner—Howard Beltran
Attorney, Agent, or Firm—Max R. Millman

[57] ABSTRACT

A coupler to connect convertible rail-highway vehicles end to end to achieve train configuration to carry vertical loads of about 25,000 pounds and at the same time provide limited rolling, pitching and yaw actions between the coupled vehicles. The coupler includes a male member extending from the front of a rear vehicle and a female member in the rear sill structure of a forward vehicle receiving the male member and a releasable locking means comprised of a vertical hole through the male member, a bushing in the vertical hole, the outer surface of which bushing is spherical, a spherical seat in the rear sill structure upon which the male member rests, a vertical locking pin, the vertical axis of the hole, spherical seat and locking pin being the same, and linkage means to selectively extend the locking pin through the vertical hole in the male member to effect coupling and uncoupling.

4 Claims, 18 Drawing Figures

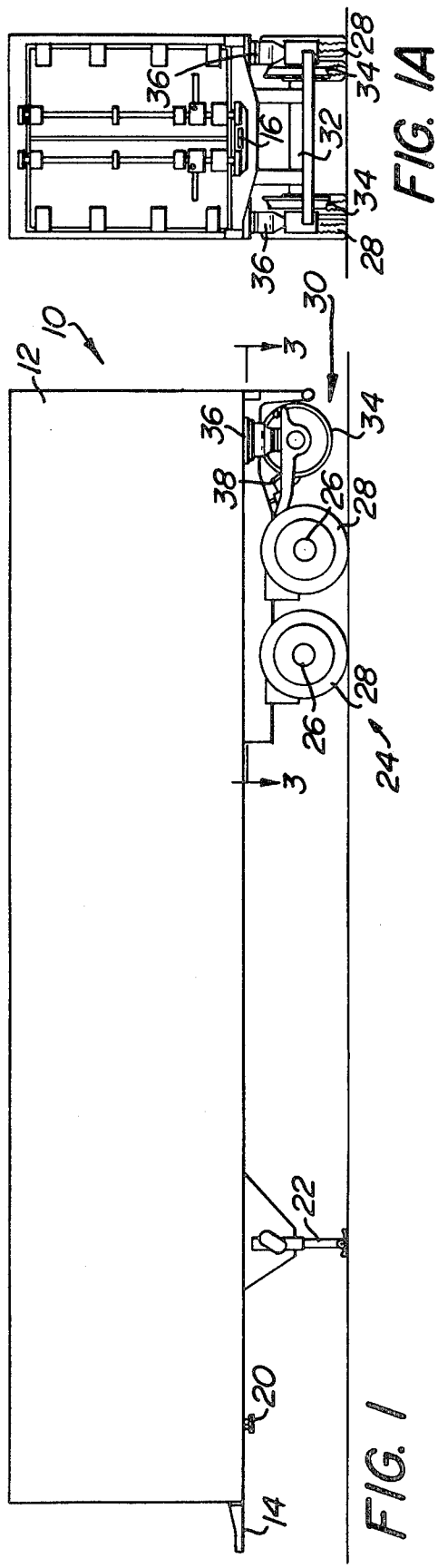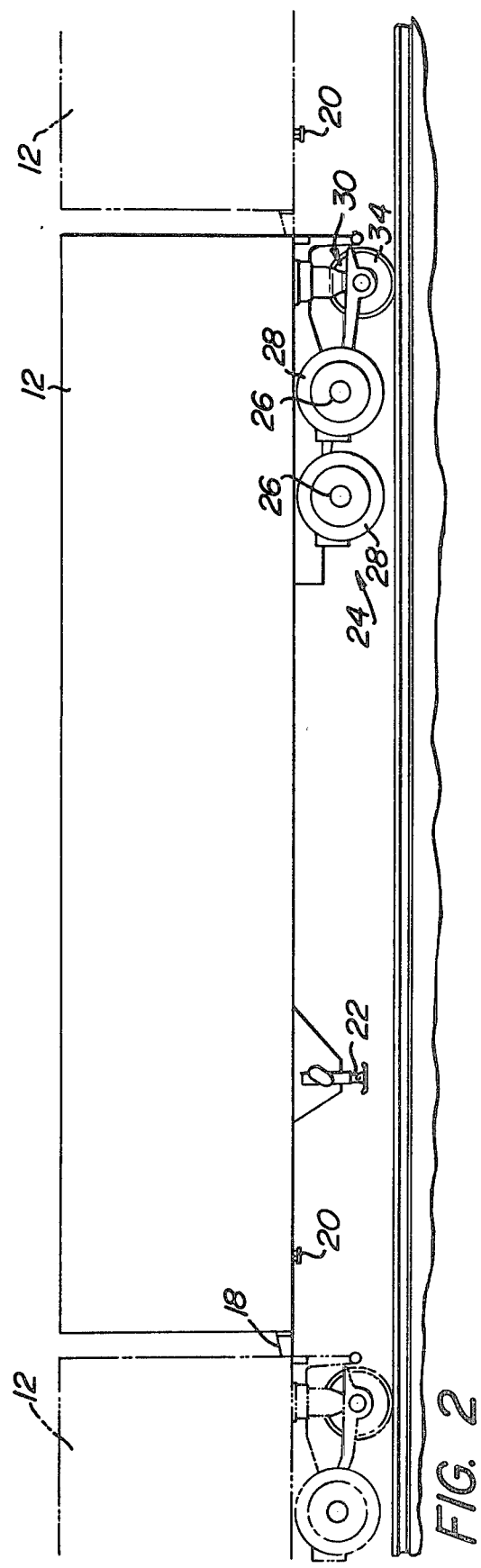

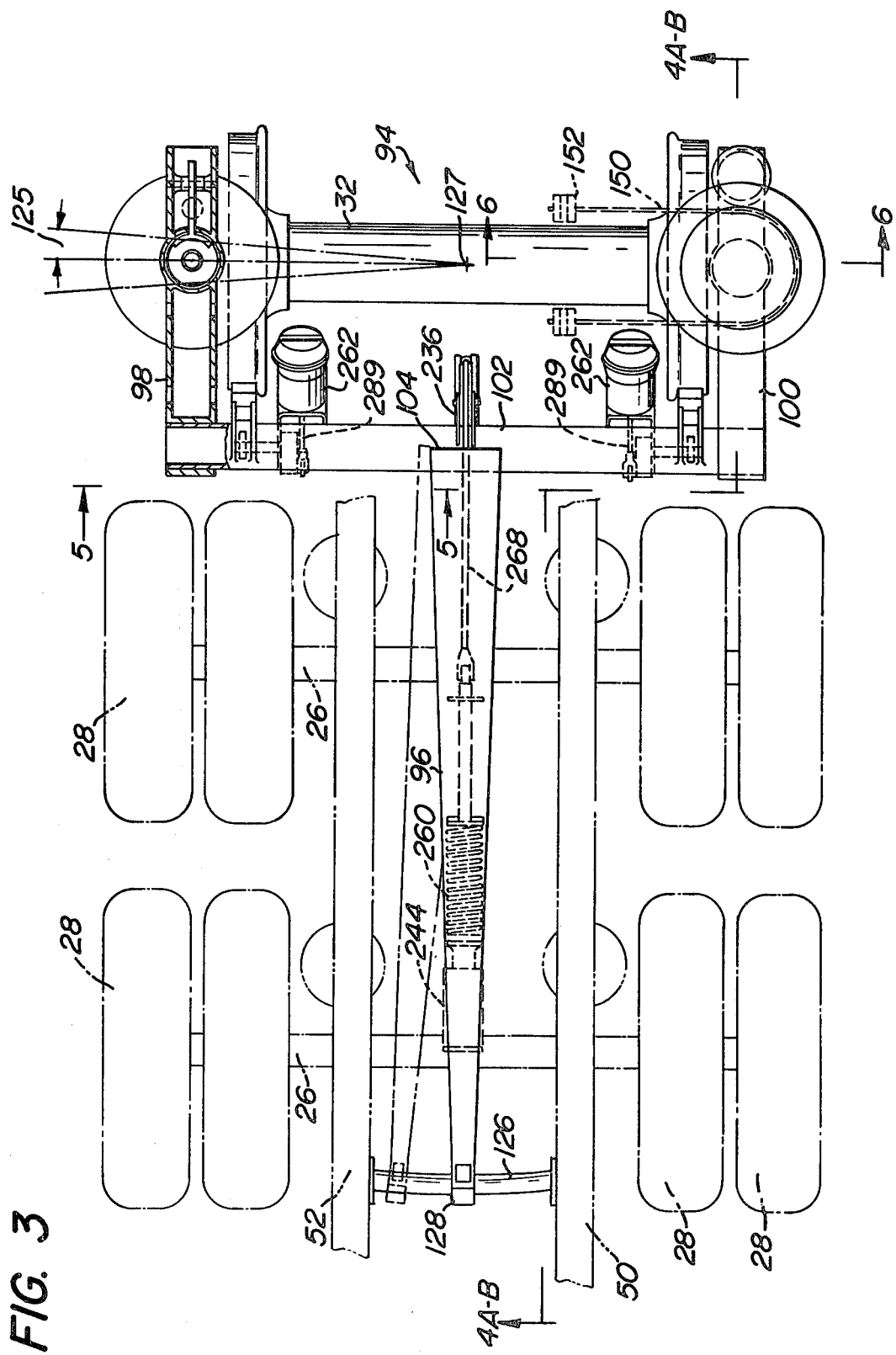

COUPLER TO CONNECT CONVERTIBLE RAIL-HIGHWAY VEHICLES END TO END

This invention relates to vehicles each carrying highway running gear with rubber tired wheels and railroad running gear with flanged railroad wheels with means to alternately raise and lower the highway running gear and railroad running gear for selective use for highway mode and railroad mode of travel.

Such convertible vehicles are disclosed in such U.S. Pat. Nos. as Browne 2,889,785, Wanner 3,002,469 and Browne 3,342,141.

In Browne U.S. Pat. No. 2,889,785 the body is provided with a center sill which adds considerable weight thereto, the highway wheel set is of the signle axle type and the railroad wheel set and highway wheel set are both pivotably interconnected via support arms suspended from the vehicle frame by torsion springs which are in turn connected to the frame by struts, all adding weight and mechanical complexity to the structure.

In Wanner U.S. Pat. No. 3,002,469, like Browne U.S. Pat. No. 2,889,785, the alternate ground-engaging running gear are both single axle wheel sets which are supported by a common carrier having arms that are operatively secured to a rotatable shaft which is in turn connected to the vehicle by a fork. Rotation of the shaft will allow for pivotally moving the highway and rail axles on the common carrier. Here again, the suspension adds considerable weight to the vehicle, does not employ air springs and employs the principle of rocking about a common member, as does Browne U.S. Pat. No. 2,889,785 to effect alternate selective engagement of the highway or the railroad wheels on the road or on tracks.

In Browne U.S. Pat. No. 3,342,141 which is the most pertinent reference, the highway wheel sets and the railroad wheels sets are suspended from the vehicle frame by air springs. However, the frame contains a heavy center sill, the two axles of the highway running gear each support a pair of tired wheels, four in all, instead of dual sets on each axle, or eight wheels, thereby limiting the utility of the vehicle for over-the-road or highway travel. Additionally, the highway wheel axle sets and the railroad wheel axle sets are pivotally anchored on brackets connected to the vehicle frame. This is a complex and heavy construction and uses the principle of interconnecting the wheel sets through a common retracting mechanism to effect alternate raising and lowering of the highway and railroad wheel sets.

It is the primary object of this invention to provide a convertible rail-highway vehicle which overcomes the weight and complexity disadvantages of the vehicles of the aforementioned Browne and Wanner patents and is therefore economical in construction and operation.

Another object of the invention is to provide a convertible rail-highway vehicle in which a tandem axle, dual-wheel highway running gear supports the vehicle body by means of air springs independently of the air-spring suspension of the railroad running gear and which does not employ the principle of alternately raising and lowering the highway and railroad running gear by a pivotal action and therefore does not require the heavy expensive mechanical arrangement to pivotally interconnect the respective running gears.

Another object of the invention is to provide a positive safety stop in the event of air spring failure wherein a rubber cushioned stop is raised to a suitable operating position when in the rail mode yet can be telescoped and stored in a compressed position when the rail wheels are in the raised position.

Another object of the invention is to provide a convertible rail-highway vehicle of the character described which is light enough to be competitive with standard highway trailers and provide a structure which will transmit the high buff and draft loads to the vehicle required to operate a train of approximately 50 vehicles without the use of a heavy outer sill.

Another object of the invention is to provide a convertible rail-highway vehicle of the character described employing a novel single axle rail wheel bogie which will permit the rail wheel-set to have self-steering characteristics suitable for a 45 ft. long vehicle to negotiate all main line track curves of 13° or less when the vehicles are coupled end to end and are running in the rail mode of travel, wherein the axle maintains a position radial to the curve.

Another object of the invention is to provide a substantially improved ride quality in the rail mode, while at the same time providing dynamic stability without bogie "hunting" or violent oscillations. The free-floating self-guiding design and geometry permits the rail wheel-set to conform to rail conditions without transmitting unwanted motions to the trailer body. Provision is made for adequate and suitably damped movement in the planes of principal forces, particularly, in the vertical and lateral directions.

Another object of the invention is to provide a convertible rail-highway vehicle of the character described in which the rail bogie is equipped with an improved air braking system capable of rapid application, modulation and release of braking action when the vehicles are coupled as a train, as compared to conventional railroad air brakes, and which will require no time to recharge the braking system after each brake application, and which will apply spring braking for parking.

Yet another object of the invention is to provide a convertible rail-highway vehicle of the character described employing an easily operable means for coupling the vehicle bodies end to end to provide a train of vehicles pulled by a locomotive in the rail mode, and where said coupling means do not interfere with conventional tractor-trailer geometry and permit utilization of full cubic capacity of the trailer within legal height and length limitations.

The foregoing objects are attained by structure which comprises a vehicle body in the form of a semi-trailer of conventional length, width and height, a tandem axle, dual tire highway suspension, mounted to the underframe of the vehicle body via conventional semi-trailer air springs, a single axle railway wheel bogie behind the highway wheels independently suspended from the vehicle underframe by air springs, means to inflate and deflate the highway running gear air springs and the rail bogie air springs operative with rail bogie and highway axle lifting means whereby the highway axle and wheel assemblies may be raised and stored in an elevated inoperative or non-rolling position while the rail wheels are lowered into rolling engagement with the tracks, and vice versa, means to couple the vehicle bodies end to end to form a train for the rail mode and uncouple them for the highway mode, the foregoing components being so constructed and arranged as to render them easily adaptable to various vehicle body styles, such as van, tank, hopper, etc.

These and other objects of the invention will become more apparent as the following description proceeds in conjunction with the accompanying drawings, wherein:

FIG. 1 is a diagrammatic side elevational view of the vehicle shown ready to be coupled to a tractor for the highway mode operation;

FIG. 1A is a rear elevational view of the vehicle in the highway mode;

FIG. 2 is a view similar to FIG. 1 of the vehicle in the railway mode operation with the vehicles coupled end to end to form a train;

FIG. 3 is a plan view partially in section taken on the line 3—3 of FIG. 1 and showing the rail bogie with the highway axle and wheel assemblies shown in phantom.

Specific reference is now made to the drawings in which similar reference characters are used for corresponding elements throughout.

Figure 4A:
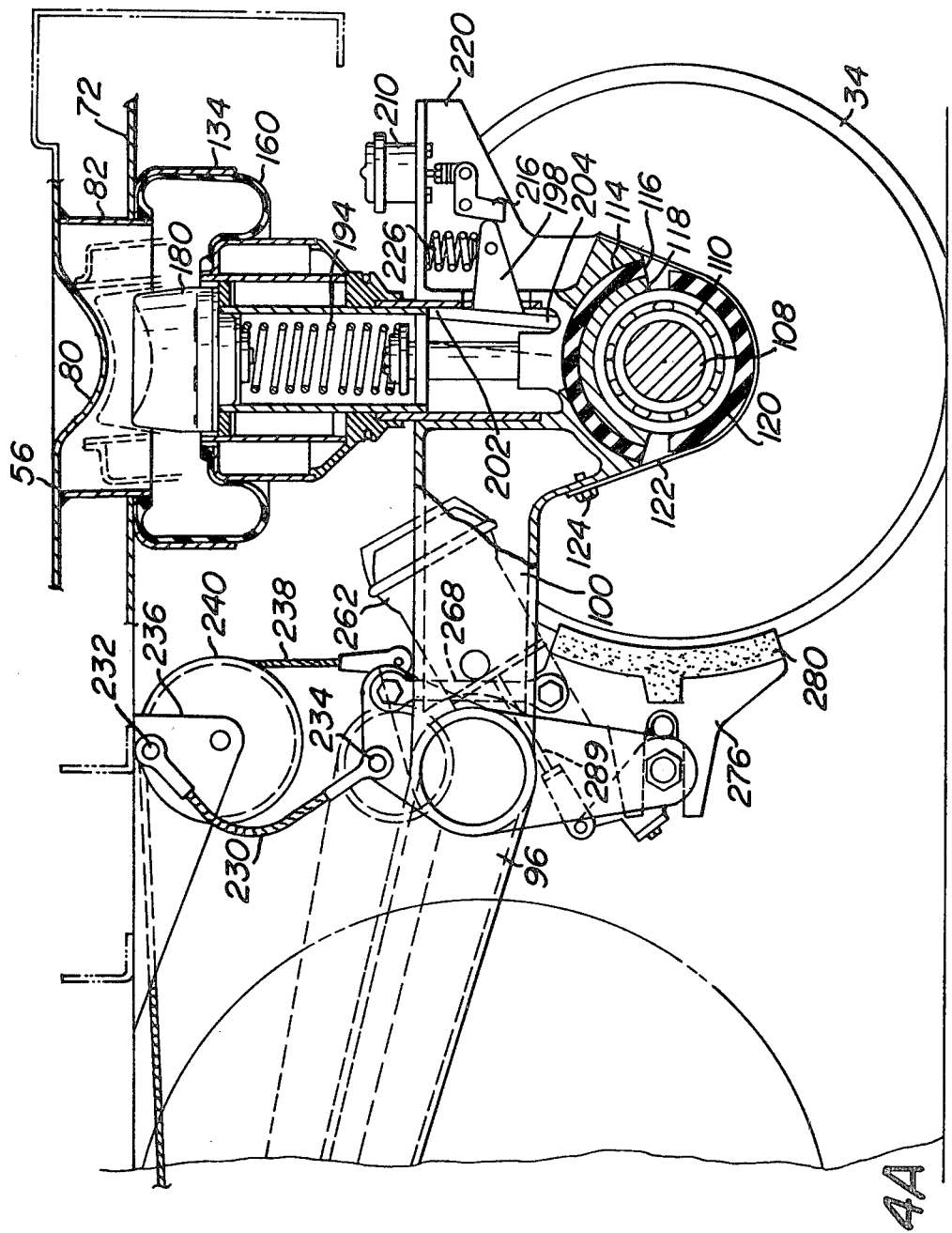
FIGS. 4A and 4B show a sectional view taken on the line 4A, B—4A, B of FIG. 3.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a conventional kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air-spring means later to be described, and a railroad bogie 30, to be described in detail later, which includes a single axle 32 mounting a pair of flanged railroad wheels 34, at appropriate rail spacing transversely, the bogie being suspended by air-spring means 36 from the vehicle body behind the highway running gear 24 and including a novel braking mechanism 38. The arrangement is such that by appropriate operation of pneumatic means, to be described hereinafter, the air springs suspending the highway running gear may be inflated to lower the highway wheels 28 into engagement with a paved road while the air springs 36 of the railroad bogie are deflated so that the axle and wheel set is raised into an elevated inoperative stored position as seen in FIG. 1, and by reversing this operation, the flanged railroad wheels 34 can be lowered to engage the track while the highway axles and wheels are raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination.

Figure 15:
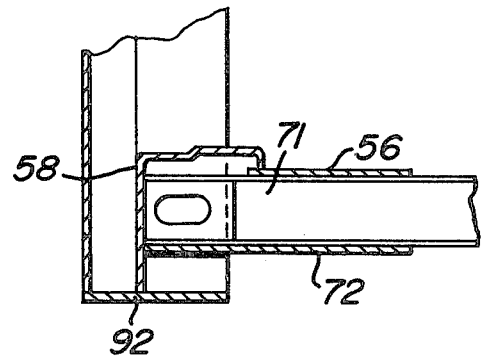
FIG. 15 is a sectional view taken on the line 15—15 of FIG. 14.
Figure 13:
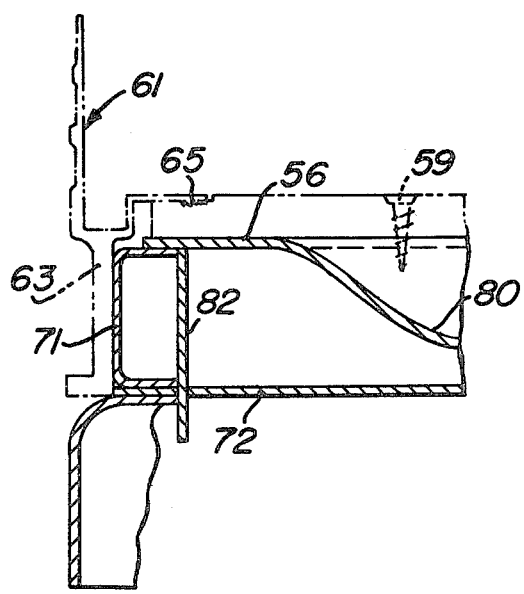
FIG. 13 is a sectional view taken on the line 13—13 of FIG. 11.
Figure 16:
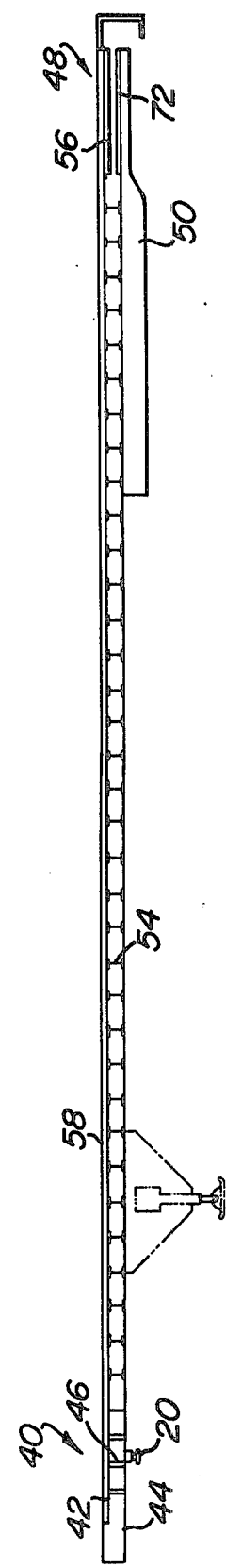
FIG. 16 is a longitudinal partial sectional view of the vehicle subframes and floor construction.

Coming now to FIGS. 13-16, it will be seen from FIG. 16 that the vehicle adjacent its front end is provided with a conventional semi-trailer kingpin subframe 40 which extends about 52 in. back into the trailer and in one typical arrangement is comprised of upper and lower plates 42 and 44 joined by cross-webs 46 forming, in effect, a box beam. At the rear end of the trailer is a rear sill structure 48 which runs the full width of the trailer, is about 20 in. top to bottom, extends about 36 in. into the trailer and will be described in detail shortly. In a standard trailer the rear sill is only 8-12 in. top to bottom and extends 3-6 in. into the trailer. The rear sill structure is secured between the body side rails 61, to its bottom surface is mounted the conventional longitudinal channels 50 and 52 which mount the highway running gear 24 and, as is known in the art, these running gear channels 50 and 52 are about 34 in. apart at the center of the trailer, and extend approximately 14 ft. forward from the rear of the body.

Between the rear end of the kingpin subframe 40 and the front end of the rear sill structure 48 a relatively large number, in the neighborhood of 35-40 I-beam cross members 54 at about 12 in. centers are provided, secured at their ends to the body side rails 61 to some of which are secured the running gear channels 50 and 52, the upper flanges of the cross members 54 being on a level with the upper plate 42 of the kinpin subframe and the upper plate 56 of the rear sill structure.

Running lengthwise of the trailer are floor boards 58, about 12 in. wide, preferably laminated hardwood, which along their abutting edges are milled into ship lap, tongue and groove or other suitable joints. The floor boards are adhesively bonded to the upper plates 42 and 56 of the kingpin subframe and rear sill structure respectively and are also secured to said plates and to the upper flanges of the cross members 54 by a multitude (about 800-1000) of self-tapping screws 59, see FIG. 13. Thus, this floor structure eliminates the need for a heavy center sill as in Browne U.S. Pat. Nos. 2,889,785 and 3,342,141 yet is capable of transmitting buff and draft loads of a high order of magnitude to the vehicle, particularly when the vehicles are coupled and running in the railroad mode as seen in FIG. 2. Additionally, side rails 61 extend the full lenth of the trailer from front to rear and are usually an aluminum extrusion of profile shown in FIG. 13 except that in the present vehicle that portion 63 of each side rail beneath the floor is about twice the thickness of conventional side rails. Each side rail also includes an inwardly extending, preferably toothed flange 65, overlying and sealing the floor boards at both sides of the vehicle.

Figure 10:
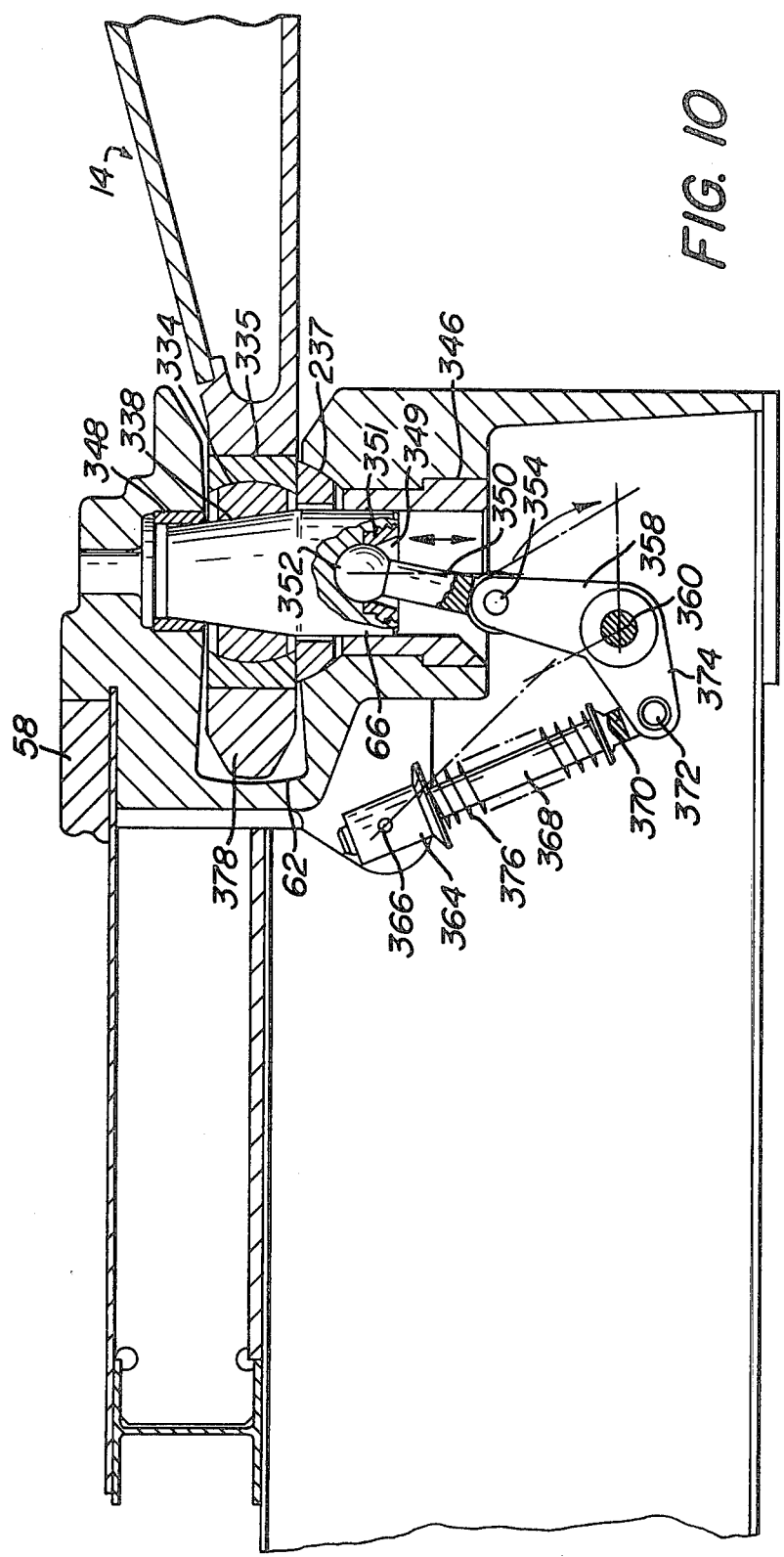
FIG. 10 is a vertical section of the coupler taken on the vehicle centerline.
Figure 12:
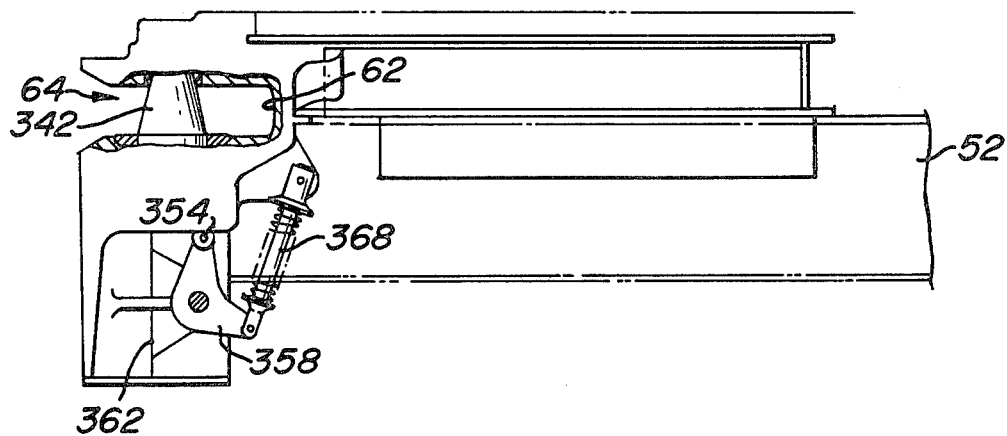
FIG. 12 is a sectional view thereof taken on the line 12—12 of FIG. 11.

The rear sill structure 48 includes a central casting 60 of generally "T" shape when viewed from the rear (see FIG. 14), a horizontal hole or slot 64 terminating in an arcuate wall 62 (see FIGS. 10 and 12) adapted to receive the male coupling member extending from the front of an adjacent vehicle, a vertical bore 66 intercepting the slot 64 adapted to receive a coupler locking pin and other parts required to accommodate the coupler pin and locking mechanism as will appear hereinafter.

Extending longitudinally from the casting 60 and secured thereto as by welding is a web member 68 shown here as a channel. The upper or top plate 56 which extends the full width of the vehicle and about 36 in. into the same is welded to the top of the channel member 68 through openings 70. Extending longitudinally on both sides of the rear sill structure for bolting to the median portion 63 of the side rail 61 are side channel members 71, the side edges of top plate 56 being welded thereto along the top flanges of said side channels.

A bottom plate 72 is provided which is substantially coextensive with the top plate 56 and which is spaced vertically therebeneath, the bottom plate being welded to the bottom of the central channel member 68 and to the bottom flanges of the side channel members 71. Thus, the top and bottom plates form, in effect, a sandwich between which are welded diagonal braces 74 and 76, the diagonal braces 74 being secured at their outer ends as at 78 to the casting 60.

Inboard of and adjacent each side of the vehicle, the top plate 56 is provided with a downwardly indented portion 80 and extending downwardly from the top plate around said indented portion is a tubular or pipe member 82 which extends downwardly through a suitable opening 84 in the bottom plate 72. It is at these two locations that the air spring assemblies 36 of the railroad bogie 30 are connected to the body structure.

At its rear, the rear sill structure includes a vertically depending member 86 which is in the form of symmetrical right hand and left hand members comprised of formed plates 88 and 90 which are welded to the central casting 60 and to the rear edges of the top and bottom plates. At their bottom edges, plates 88 and 90 are welded to a continuous bottom flange 92 which extends the full width of the vehicle.

Figure 4B:
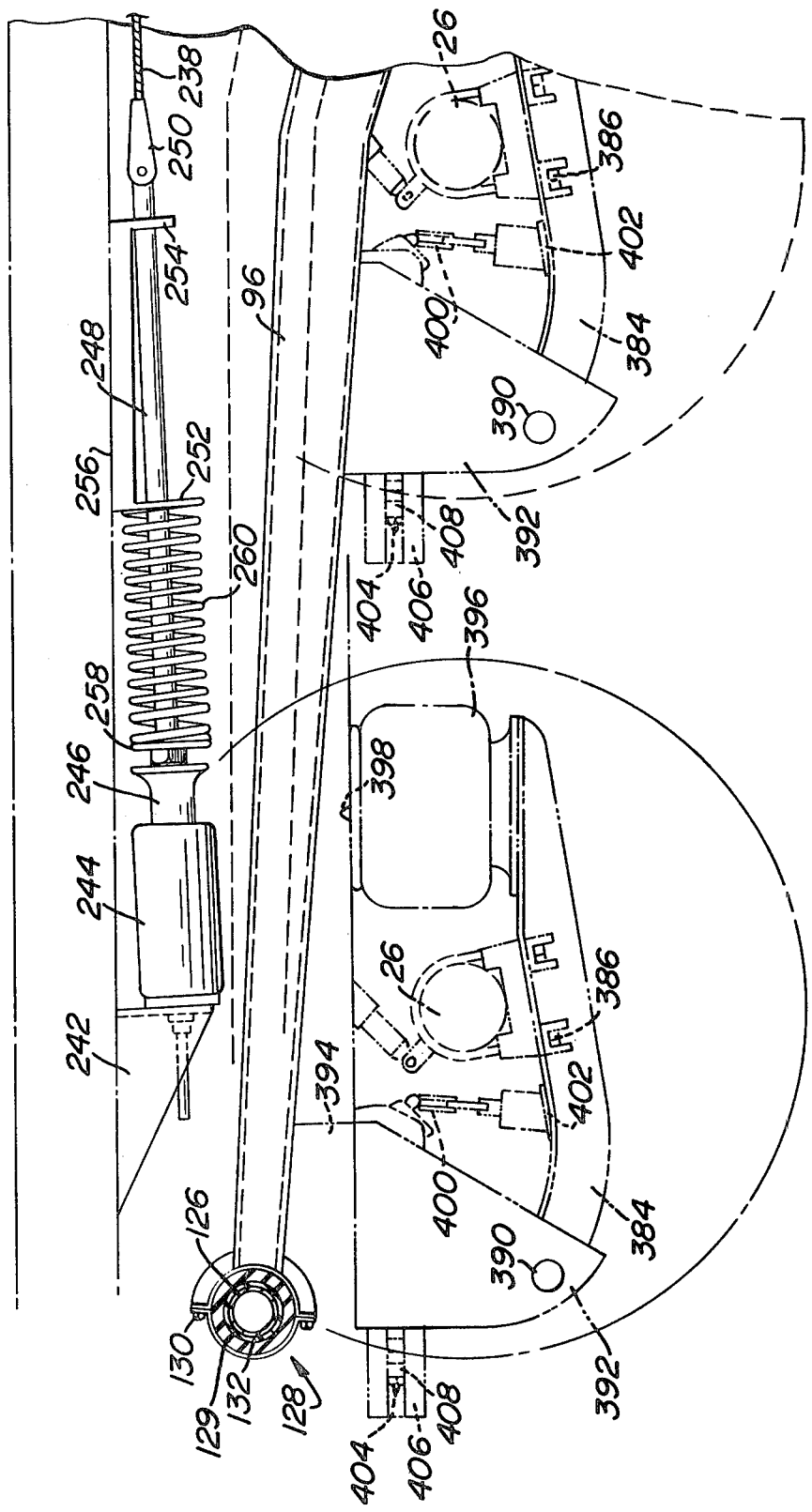
Figure 6:
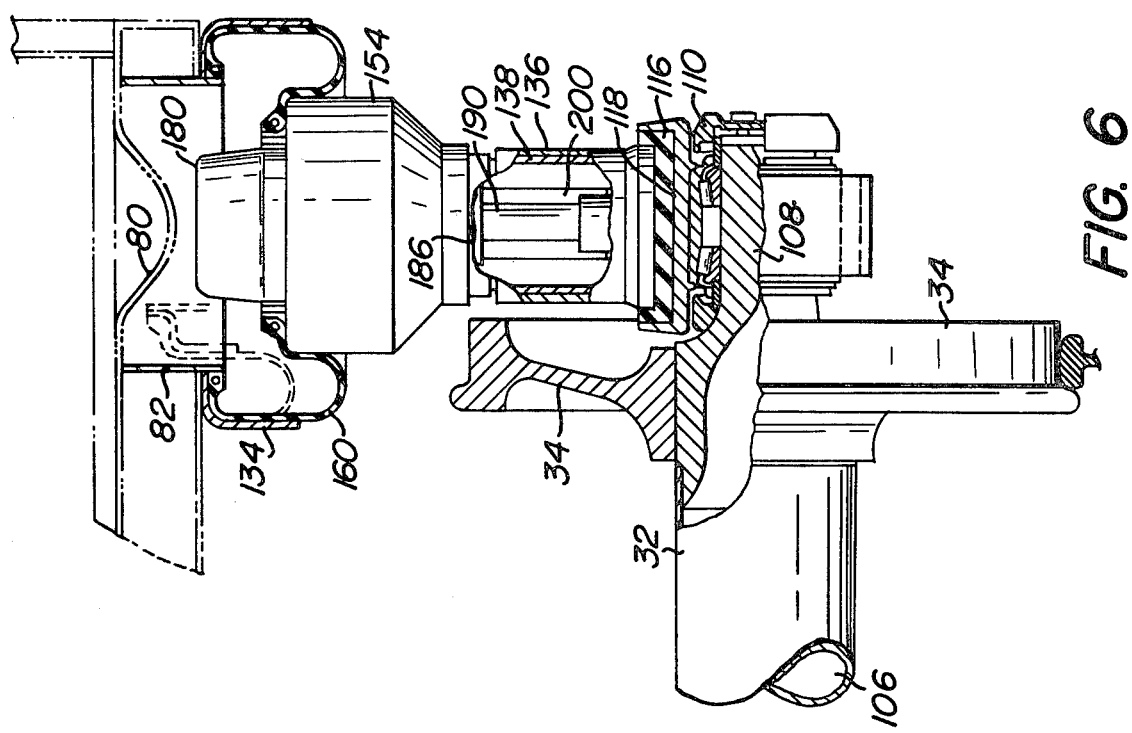
FIG. 6 is a sectional view taken on the line 6—6 of FIG. 3.
Figure 5:
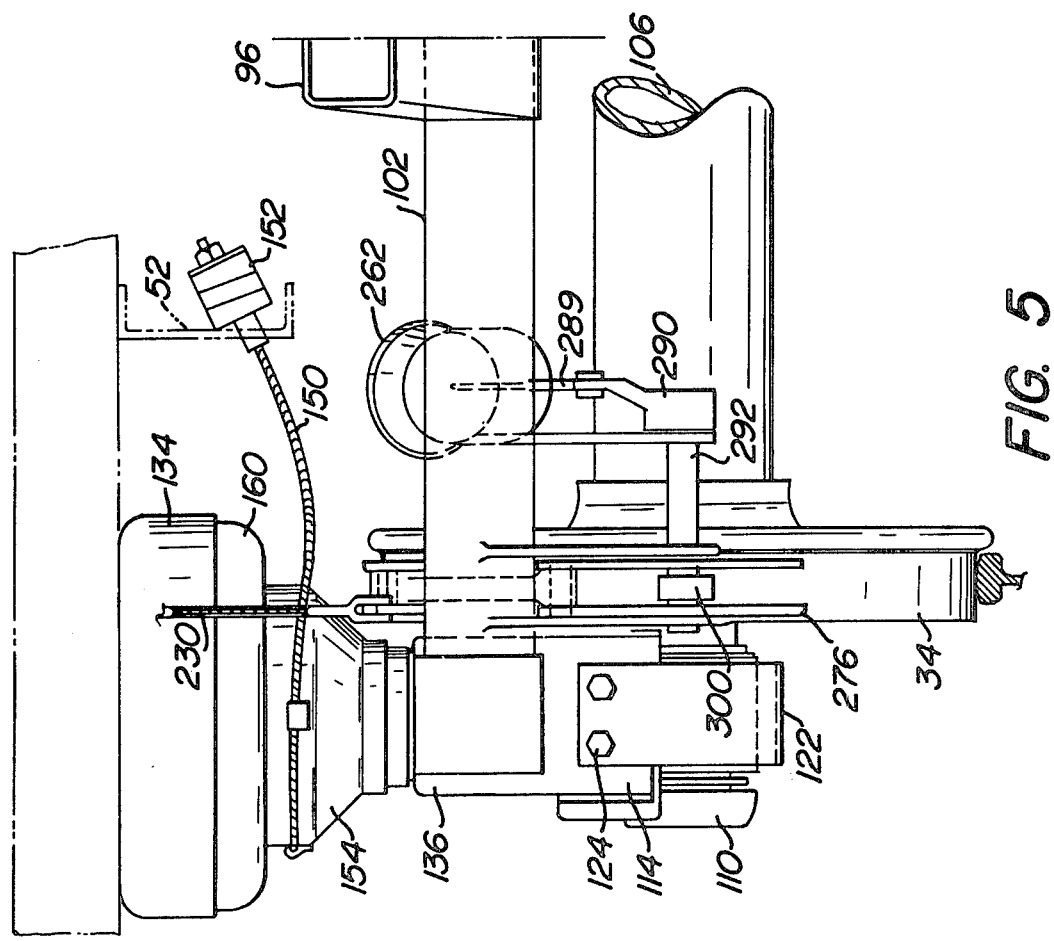
FIG. 5 is an elevational view looking from the line 5—5 of FIG. 3.

The bogie 30 which is shown in detail in FIGS. 3, 4A and 4B comprises a yoke 94 and a longitudinally extending tubular tongue 96 which is angulated so that its forwardly extending portion overlies and clears the highway wheel axles 26. The yoke comprises transversely spaced longitudinal forwardly extending side members 98 and 100, preferably of cast hollow rectangular configuration which are connected at their forward ends by a transversely extending tubular member 102. The tongue 96 is welded to the transverse tubular member of the yoke as at 104 centrally thereof.

The railroad axle 32 may be hollow as seen at 106 or conventionally solid and terminates in solid end spindles 108 which may be welded into the hollow portion or merely extensions of a solid axle. A conventional Timken railroad roller bearing 110 is mounted on the spindle 108 and has an outer diameter less than that of the axle diameter upon which the wheel 34 is mounted.

To provide support for the ends of the axle, the side members 98 and 100 of the yoke have a downwardly opening upwardly curving arcuate portion 114. The arcuate portion receives an arcuate laminated rubber block 116 which bears on an arcuate steel member 118 which in turn supports the top of the wheel 34 bearing 110.

Another arcuate rubber block 120 engages the lower portion of the bearing and the assembly is held in place by a strap 122 which abuts the lower rubber block 120 and is secured to the portion 114 by suitable bolts 124. Thus, to change the wheels, one need only remove the bolts 124 and the strap 120 to remove the wheel set. The wheels 34 which are press fit onto the outer diameter of the axle can then be pulled and will clear the bearing 110 without the need to remove it, a present practice which requires extra time and effort.

At the location of the forward end of the tongue 96, which is about 10 ft. long, an arcuate tube 126 is secured to the running gear channels 52 and 54 of the vehicle extending transversely therebetween. The forward end of the tongue is provided with a split collar 128, retained by bolts 130, the collar having rubber bushing 129, a Teflon or similar low friction material bushing 132 therein slidably receiving the arcuate tube 126. Thus, the bogie is allowed to self steer as the front end of the tongue is allowed to slide from side to side on the arcuate tube 126 so that the rail axle is free to rotate about a vertical axis 127 at its center. The steering angle is limited by the length of the arcuate member 126 and is shown in phantom in FIG. 3 as 125. When the railroad brakes are applied, the arcuate tube 126 supplies the longitudinal restraint, and also the vertical restraint to the forces produced by the brake torque. It will be understood that while a circular cross-section of the arcuate tube 126 and bushing 130 is preferred, they can be of any other suitable cross-sectional shape, such as rectangular, etc.

Figure 8:
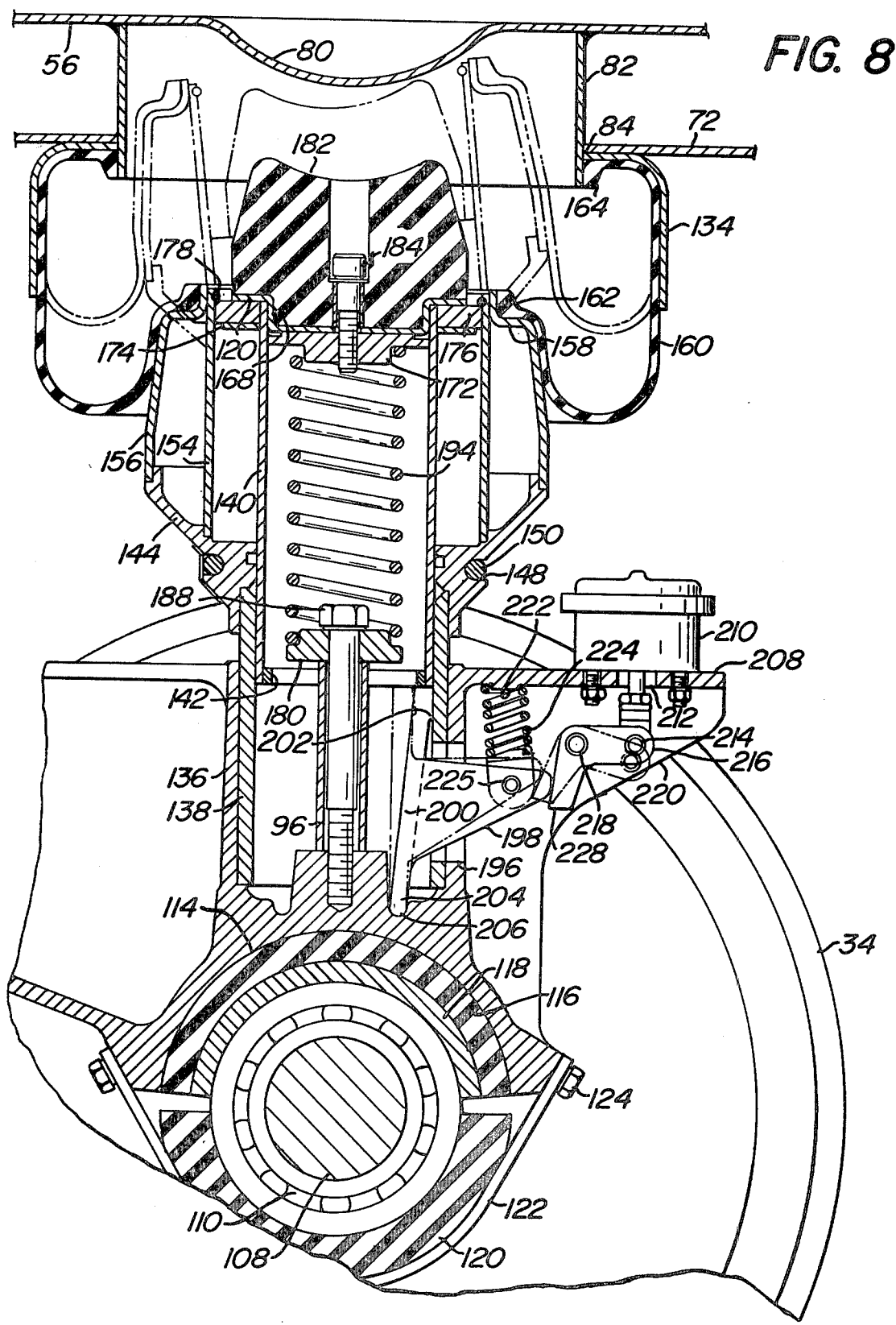
FIG. 8 is an enlarged vertical sectional view through the railroad air spring suspension means.

Referring now to the air suspension of the rail bogie, there are two essentially vertical legs which are the same; therefore, a description of one will suffice. As indicated heretofore, and as shown in FIGS. 4B and 8, the indentation 80 in the top plate 56 is designed to take compression under certain failure conditions to be described later and is surrounded by a pipe member 82 which extends through a circular opening 84 in the lower plate 72. Secured to the lower plate and to the pipe member 82 adjacent its lower end and extending therebeneath is a round air bag enclosing member or "can" 134. Each casting 98 and 100 of the side members of the bogie includes a tubular upwardly extending vertical portion 136, and pressed into the internal diameter thereof is a further vertical upwardly extending member 138 which at its upper end is in turn welded to a circular casting 144 which is also welded to an inner tubular member 154 and an outer tubular member 156 which is also welded to inner member 154 at their upper edges. A leg is thereby provided in which the casting 144 of the leg includes an outer groove 148 which receives a cable 150 which wraps around the outboard portion of casting 144 and is connected to the longitudinal highway running gear channel 52. The cable is a lateral restraint, and shock-absorbing means 152 is carried by the end of the cable where it is attached to the channel 52.

The leg which is comprised of tubular member 138, the casting 144 and the tubular members 154 and 156 are load bearing members adapted to support about 30,000 lbs. in normal operation.

An open-ended round torous-shaped reinforced rubber invaginating air bag 160 adapted to operate at internal pressures on the order of 100 psi is provided having thickened end portions 162 and 164 which may include wire reinforcements as in tire beads which are sealed to the rim 158 of the strut member 156 and to the rim 166 formed beneath the position where the can 134 meets the pipe 82. The air bag accommodates lateral, vertical and fore and aft movements.

A plate 168 in the form of an inverted round hat section includes a rim portion 170 which rests on the top of the innermost tube 140, the median portion of the plate 168 which extends into the top of the tube 140 abutting a spring seat member 172 which is in turn welded to the inside of the tube 140 adjacent its upper end. A disk 174 is welded to the tube 140 at its outer surface and extends into the space between the tube 140 and the leg tube 154. In the space between the rim 170 and the disk 174 is a low-friction split circular guide 176, preferably made of Teflon, which also has gaps in its outer periphery to allow air to pass through. A ring 178, located in a groove in tubular member 154, limits the travel of the piston formed by parts 140, 172, 174, 168 and 176.

A molded rubber bumper 180 is bonded to the plate 168 and includes an upper concave surface 182 corresponding to the dished-in portion 80 of the upper plate 56 of the rear sill structure. The bumper 180 is secured to the spring seat member 172 by a suitable bolt 184. A further lower spring seat member 186 is provided within the tube 140 and a bolt 188 extends through the member 186 and is threaded into the casting 114, there being a spacer tube 190 abutting the casting and the member 186. A spring 194 is interposed between the seat members 172 and 186 which normally urges the bumper into an upward position towards the indentation 80 of the plate 56.

The latch mechanism operative with the aforedescribed railroad air bag suspension comprises the following. An opening 196 is provided in the leg member 138 and tubular extension 136 of casting 114 through which extends a horizontally extending cam finger 198. The finger 198 is an extending portion of the latch member which also includes a vertically extending portion 200 adjacent whose upper end is a lateral protrusion 202 and whose lower end 204 is seated in a circular groove 206 in the casting 114 adjacent the opening 196 in the strut.

Extending longitudinally from the vertical member 136 of the casting 114 is an integral horizontal extension 208 upon which is bolted an auxiliary air chamber 210 which operates a piston (not shown) whose rod 212 extends through an opening in the horizontal extension 208. The piston rod is pivotally connected by a pin 214 to a bell crank 216 which is in turn pivoted at its corner by a pin 218 to a gusset 220 of the castings 98 and 100. Between a seat 222 on the horizontal extension 208 and a member pivoted by a pin 225 to the finger 198 is a spring 224 which urges the finger 198 downwardly and, hence, the lateral protrusion 202 of the latch 200 beneath the ledge 142 of the tube 140 to support the same.

It will be seen that the load support is carried from the rail to the railroad wheels 34, to the axle 32, to the bearing 110, to the casting 118, to the leg assembly and finally to the air bag 160, and thence to the body sides. When there is a sudden loss of air from the bag, as in the event of a bag rupture, the load goes from the indented portion 80 of the plate 56 to the bumper 182, to the inner tube 140, to the latch 200, to the casting 114 and then to the axle.

To collapse the suspension, that is, to ultimately raise the railroad wheels into a stored position and lower the highway running gear into a load supporting position, the air bags of the highway running gear are inflated. At essentially the same time, the air is vented from the air bags 160 or the pressure therein reduced and the auxiliary air chamber 210 is actuated whereby its piston rod 212 turns the bell crank in a clockwise direction. The arm 228 of the bell crank acts against the free end of the cam finger 198 against action of the spring 226 rocking the latch bar 200 in a counter-clockwise direction until its protrusion 202 moves out of the position of supporting the tube 140 thereby allowing the leg assembly to move upward while the bumper 182 remains in contact with the indented portion 80 of the plate 56, the parts assuming the position shown in phantom.

To prevent accidental separation of the bogie from the vehicle, a downstop cable 230 is connected as at 232 and 234 to a cross member of the vehicle and to the yoke member 102 respectively.

When the leg assembly is permitted to telescope by the removal of the restraint of the bumper latch, the suspended portion of the bogie can be lifted to a stored position while the vehicle is in the highway mode with the tired wheels engaging the ground and supporting the load.

A bracket 236 is welded centrally to the cross member 102 of the bogie to which is attached a cable 238 which is trained over a pulley 240. Another bracket 242 is mounted on one of the vehicle subframe members and supports an air actuator 244 whose piston rod 246 bears against a rod 248 whose other end is connected to the cable 238 as at 250. The rod 248 extends slidably through the arms 252 and 254 of a guide bracket 256 which is secured to the cross members of the trailer or vehicle. At the end of the rod 248 adjacent the piston rod 246 a washer 258 is secured and, between the washer 258 and the arm 252 of the guide bracket 256, a spring 260 is interposed and wound about the rod, the spring rating being very high, in the order of magnitude of 3000 lbs. to counter-balance the weight of the bogie.

In the rail mode with the railroad wheels engaging the tracks, the air spring actuator 244 extends the piston rod 246 compressing the spring 260 and thereby removing tension from the cable 238 when the axle 32 is in the down position. When the air bags of the rail bogie are deflated and air is fed into the air spring suspensions of the highway running gear, air is vented from the actuator 244 depressurizing it and allowing the spring 260 to expand against the piston rod 246 and to thereby pull the cable 238 and lift the bogie and, hence, the railroad wheels off the rails, in which action the tongue bushing 132 rotates around the arcuate member 126 attached to the vehicle. This is the stored position of the railroad bogie.

Figure 7:
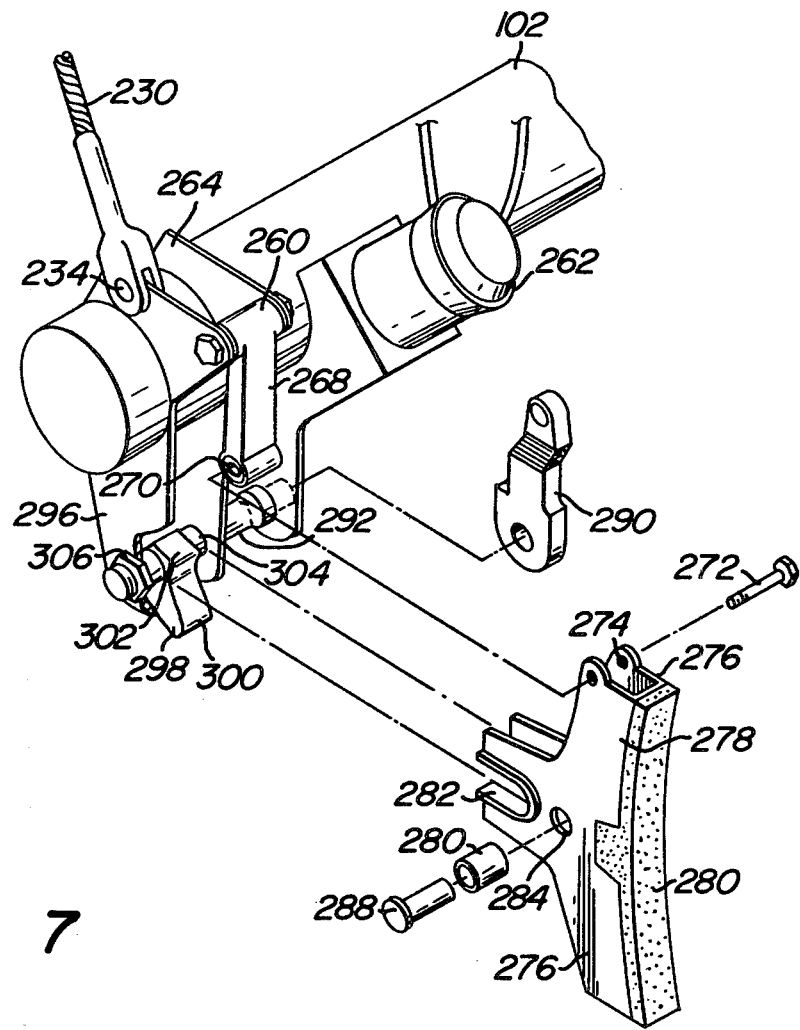
FIG. 7 is an exploded perspective view of the railroad brake.

The railroad bogie also mounts the wheel brakes, which braking mechanism will now be described, with reference particularly to FIG. 7. Here again, since both brake mechanisms for the railroad wheels are the same, only one will be described. Mounted on the cross member 102 of the bogie adjacent each wheel is a conventional brake chamber 262, which includes a service chamber and a spring brake chamber, in the service chamber of which air operates a piston through a diaphragm and is spring returned, while in the spring brake chamber, air keeps a very strong spring compressed and inactive. In the event of a failure in the air system, or in parking, air is exhausted from the spring brake chamber, allowing the spring to apply brakes, a commercial unit available from many companies, such, for example as, Model SB-3 marketed by Bendix Heavy Vehicle System Group of Elyria, Ohio and Part No. 5178500, Ultra-Brake, marketed by The Berg Mfg. Co. of Des Plaines, Ill. Spaced brackets 264 are welded on the bogie crossmember 102 to one of which the downstop cable 230 is attached as at 234. Swingably mounted as at 266 between the brackets 264 is a hanger bar 268 whose other end contains a rubber bushing 270 by which the hanger bar is connected via a bolt 272 which extends through the bushing and holes 274 in the opposed plates 276 of a brake shoe head 278 having an arcuate wheel-engaging braking face 280. The hanger bar takes most of the braking forces.

Centrally of the brake shoe head and opening opposite its brake face is a U-shaped slot 282. Behind the slot the shoe contains a transverse hole 284 which receives a roller 286 and a pin 288 extending through the roller to retain it in the hole.

The piston rod 289 operated by the brake chamber 262 is operatively connected to a slack adjuster 290. Connected to the bottom of the slack adjuster is a shaft 292 which extends rotatably through appropriate holes in brackets 296 depending from the bogie cross member 102, there being a nut 306 to hold the shaft 292 in the bracket 296. The shaft has a cam 298 splined thereon which has an arcuate raised cam face 300 and a depressed portion 302 adjacent the shaft. On each side of the cam, rollers 304 are carried on the shaft 292 between the cam and brackets 296.

The brackets 296 straddle the brake shoe head, the shaft 292 extending through the U-shaped slot 282 with the cam 296 located between the slots, the rollers 304 bearing on the slots 282 to prevent rotation of the shoe assembly. When the brake chamber is not actuated and the brake shoe is not applied to the wheel, the roller 286 rests in the depressed portion 302 of the cam. When the brake chamber is actuated, the shaft 292 is rotated counter-clockwise and the arcuate cam face 300 engages the roller 286 thereby urging the brake shoe against the wheel. When brake pressure is not applied, gravitational forces act upon the brake shoe and head so as to keep surface 280 away from the surface of the wheel 34.

Figure 11:
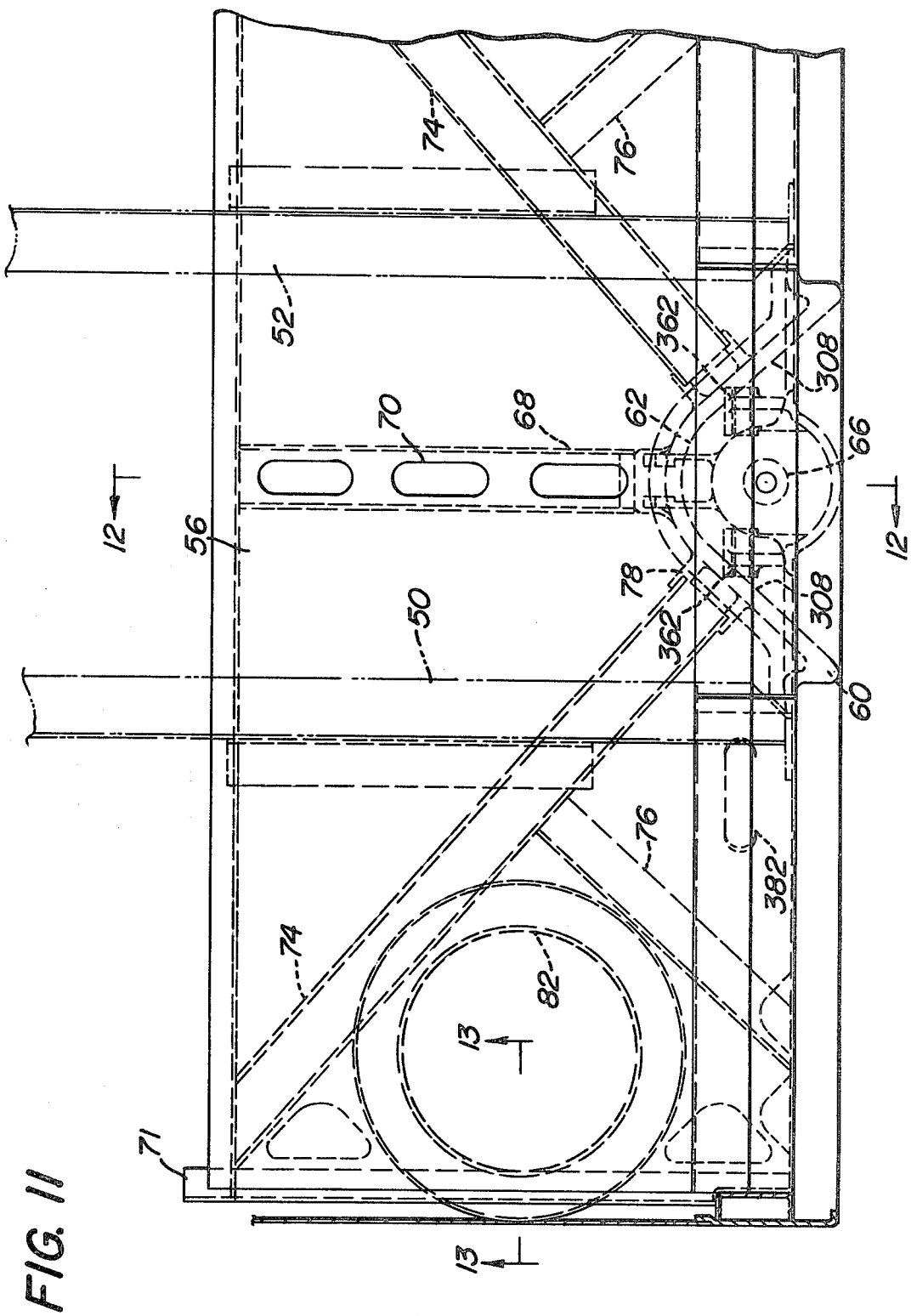
FIG. 11 is a top plan view of rear sill construction of the vehicle.
Figure 14:
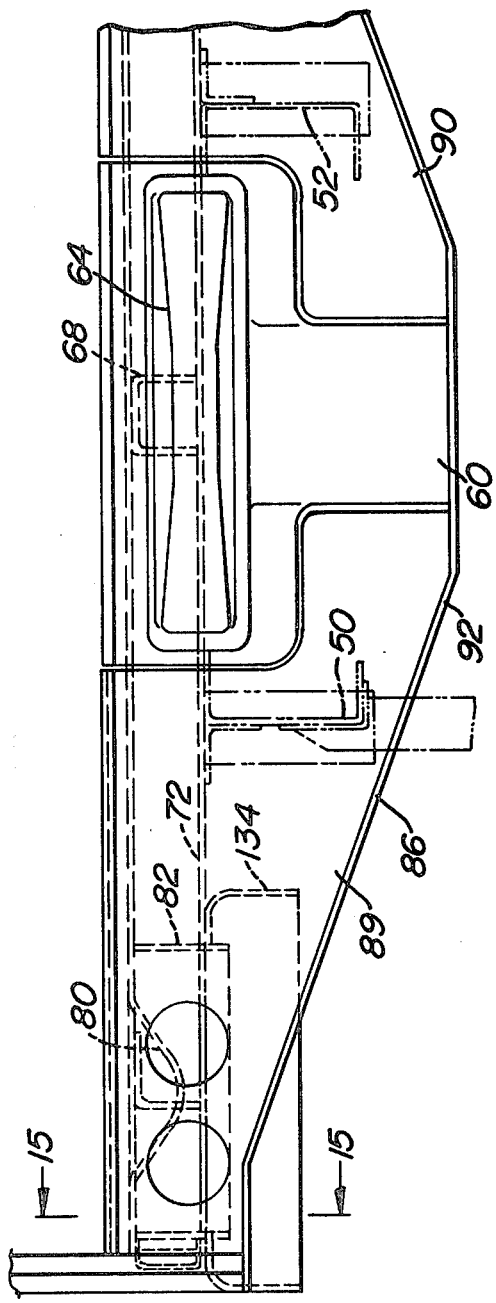
FIG. 14 is a partial rear elevation of the rear sill construction.

In the rail mode, to form a train of the trailers they must be coupled end to end by means of the male coupler 14 protruding centrally from the front of the trailer and adapted to be releasably locked into the female coupling slot in the rear sill of the adjacent trailer; thus, each trailer is equipped with a male and female coupling member at the front and rear thereof, which is shown in detail in FIGS. 11, 14 and 15. The central portion of the rear sill construction, namely, the casting 60, is formed with a hole or slot 64 which opens through the rear end of the sill and whose outer face is flush therewith. The slot 64 is almost as wide as the casting 60 and is inwardly tapered as at 308. The male coupling pin 14 is tapered to conform to the taper 308 of the female receiving slot but has a smaller included angle between its sides to allow limited horizontal rotation on the coupling pin 338.

A manually operable locking mechanism is provided to releasably lock the male coupler in the female slot and comprises the following.

The central portion of the male coupler 14 includes a vertical hole 332 around which is a spherical bearing comprising an inner bushing 334 and an outer bushing 335 held in place by a snap ring. The bottom face of the male coupler rests on a spherical washer 337 to permit limited relative pitching and rolling motion between adjacent vehicles in the train as well as the rotation previously mentioned.

The vertical locking pin 338 includes a lower cylindrical portion 340 and an inwardly tapered upper portion 342. The vertical bore 66 may include a lower hardened bushing 346 and an upper hardened bushing 348 to minimize wear on the casting 60.

The lower end of the vertical locking pin 338 is provided with a recessed socket 339 into which extends a connecting link 350 whose upper end is enlarged and substantially spherical and is pivotally connected to the vertical locking pin for movement about an axis 352 diametrically therethrough and restrained in the socket by seat bushing 351. The lower end of the link is pivoted about pin 354 about an axis parallel to 352 to one leg 356 of a bell crank 358 whose corner is, in turn, pivoted about an axis parallel to 352 and 354 on a shaft 360 supported in bearings 362 in casting 60.

A bearing 364 in the form of a collar is pivoted as at 366 to another portion of the casting 60 for movement about an axis parallel to the other axes 352, 354 and 360. Slidable in the bearing is a rod 368 having a yoke 370 adjacent its lower end, the yoke 370 being connected by a pin 372 to the other arm 374 of the bell crank around an axis parallel to the other axes. A spring 376 is wound about the rod 368 and normally urges the rod downwardly.

In operation of the coupler to couple the vehicles end to end, the front vehicle is backed up toward the following vehicle until the male coupler 14 enters the tapered female opening 64 until its nose 378 bottoms against arcuate surface 362 of casting 60. The shaft 360 is manually rotated counter-clockwise causing the bell crank 358 to rotate. As pin 372 moves past the line of center between 366 and 360, the spring 376 augments the rotational action of the bell crank and, through connecting rod 350, urges the locking pin 338 upwardly through the hole 332 in the male coupler 14. The pivot 354 ends up on the line of centers between pivot 360 and pivot 352 thereby producing a secure locking action which may be augmented by allowing pivot 354 to move slightly over center.

To uncouple the vehicles, one applies force to turn the shaft 360 which forms the pivotal connection between the corner of the bell crank and the casting gusset 362, through an appropriate opening 382 in the rear sill. Rotation of the shaft 360 clockwise retracts the vertical locking pin 338 from the vertical hole 332 in the male coupler compressing spring 376 and, thus, rotating the bearing 364 in a counter-clockwise direction about its pivot 366. When pivot 352 passes the line of centers 366–360, the compressed spring 376 retains the locking pin 338 in its retracted position. Further clockwise rotation of the bell crank is prevented by a stop (not shown).

Coming now to the air spring means and lifting mechanism for the highway axle and wheel assembly, reference is made particularly to FIG. 4B. It should be noted that the highway axle and wheel assembly is suspended from the conventional channel rails 50 and 52 by air springs and lifting mechanisms embodied in a commercially available suspension as, for example, Model ART-555-B-3 Neway Air Ride (trademark) marketed by Neway Division, Lear Siegler, Inc., Muskegon, Mich.

There are two such mechanisms per trailer axle 26 and each comprises a trailing arm 384 substantially on the center of which is mounted as at 386 which prevents the axle 26 from rotating and positions the axle on the trailing arm. The forward end of the trailing arm is pivoted for movement around a transverse axis as at 390 to a bracket 392 which is bolted as at 394 to one of the longitudinal channel rails 50. At the other or rear end of the trailing arm is mounted a conventional trailer air spring 396 which is secured at its upper end to the longitudinal channel rail 50 as at 398.

In converting the vehicle from the highway mode to the rail mode, the air from the bag 396 is depressurized or vented, thereby allowing the axle and wheel assembly to be raised. The means to raise the highway wheels and axle to its stored position comprises a chain 400 which is secured as at 402 to the trailing arm 384 forward of the axle 26, the chain being connected by linkage to a rod 404. A suitable bracket 406 is secured to the suspension bracket 392. A compression spring 408 is wound about the rod 404 and is interposed betwen suitable stops. When the air bag 396 is pressurized and the trailer wheels engage the ground in the highway mode, the spring 408 is compressed. When the air bag 396 is depressurized with the vehicle body supported by the rail bogie, the spring 408 expands and thereby raises the trailing arm and associated axle 26 and highway wheels 28 into the stored position.

Figure 9:
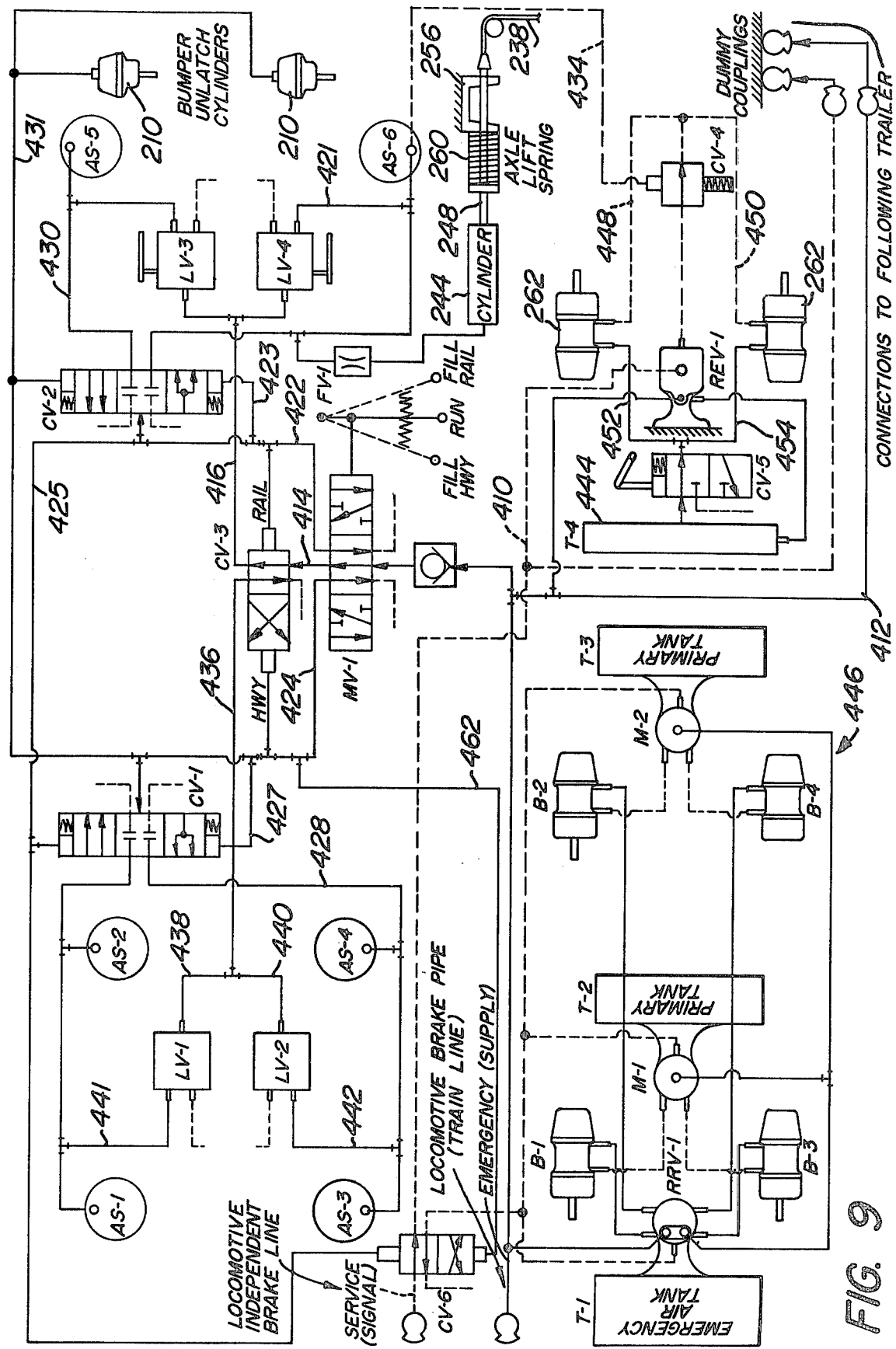
FIG. 9 is a diagrammatic view of the pneumatic control system.

The brakes for the highway wheels are conventional and, hence, there is no need to show or describe them except as they are shown in FIG. 9, the diagrammatic plan of the pneumatic control system which will now be described.

Assume the vehicle has been operating in the highway mode and has arrived at the rail yard to be coupled to other vehicles to form a train for the rail mode. A hostling tractor is coupled to the vehicle via the kingpin and the trailer air lines, service (signal) and emergency (supply) 410 and 412 respectively, are coupled by conventional glad hands to their respective tractor hoses behind the cab. The vehicle is then backed into position over the tracks. In FIG. 9 and in the description which follows, it will be understood that the symbols for the control valves are those adopted by the American National Standards Institute.

A manually operable, spring-urged, 3-way, 3-position valve MV-1 is interposed in the emergency (supply) line 412. As seen in the schematic view, the median position is Run, the right position is Fill Rail and the left position is Fill Highway. When valve MV-1 is moved to the Fill Rail position, compressed air from the emergency supply line will pass through conduit 422 and shift the pilot-operated, 2-position, 2-way valve CV-3 to a position (left on the schematic) which will subsequently allow the compressed air from the emergency line to flow into the rail air springs AS-5 and AS-6 via the conventional leveling valves LV-3 and LV-4 through conduit 414 and 416 and branch conduits 418, 419, 420 and 421, but at a very slow rate. Simultaneously, compressed air from the emergency supply line enters the conduits 422, 423 and 425 which activates the pilot-operated, spring-return, 3-position, 3-way valves CV-1 and CV-2. Valve CV-1 immediately opens conduits 426 and 428 of the highway air springs AS-1, AS-2, AS-3 and AS-4 to exhaust for rapid deflation. Valve CV-2 immediately opens conduits 430 and 432 causing communication with the supply line to allow for rapid and full inflation of the rail air springs AS-5 and AS-6 for the rail operating position. Simultaneously, compressed air is admitted into cylinder 244 extending rod 248 compressing spring 260 and allowing cable 238 and the rail axle 32 to lower. The air flow to cylinder 244 is restricted by a conventional flow control valve FV-1 to prevent the rail axle from falling freely.

At the same time, the bumper unlatch cylinders 210 are vented to exhaust through valve MV-1 to insure free engagement of the bumper latches 200 (see FIG. 8) when the rail suspension legs 154, 156 are fully extended. Since air from the highway air springs is vented to exhaust through valve CV-1, the springs 408 expand pulling on the chains 400 and lifting the trailing arms 384 and, hence, the highway axles 26 and wheels 28 into the raised, stored position.

When the rail air springs AS-5 and AS-6 are slightly overextended, valve MV-1 is released returning to the median or centered Run Position and allowing rail air springs AS-5 and AS-6 to find their proper height by operation of the leveling valves LV-3 and LV-4 which can now be supplied with compressed air from the supply line. Valve CV-3, since it is not a spring-return valve, remains in the rail position and valves CV-1 and CV-2 return to their centered or median positions. While this is unimportant to the highway air springs AS-1,2,3,4 (as they are deflated), it is necessary to prevent air from being exhausted from the rail air springs AS-5 and AS-6 in the rail mode of travel.

Valve CV-4 is a spring-urged pressure-limited valve which varies from full open to full closed, is controlled by the pressure in rail air spring AS-6 necessary to support the load, and to which it is connected by conduit 434. At lighter loads, valve CV-4 limits the service line pressure and, hence, the braking force at the rail braking chambers 262. With the rail running gear now in place and the highway wheel axles raised into the stored position, the vehicle is backed up by the tractor allowing the vehicle couplers 14 and 16 to be engaged. The hose connections to the following trailer are then disengaged from the conventional dummy glad hand couplings and connected to the glad hands of the following trailer. The connecting hoses on the rearmost vehicle are left on the dummy glad hands to close off the lines.

When converting from rail to highway operation, essentially the reverse operation is carried out. The landing gear on the lead trailer is lowered so that the locomotive can be disconnected and a tractor can be connected in its place. The valve MV-1 is moved to the Fill Highway position, causing control valve CV-3 to move to the Highway position, subsequently allowing compressed air from the emergency supply line to be fed to the levelling valves LV-1 and LV-2 of the highway running gear via conduit 436. At the same time, valves CV-1 and CV-2 are operated through conduits 427 and 429, CV-1 inflating the highway air springs AS-1,2,3,4 through conduits 426 and 428, and CV-2 opening the rail air springs AS-5 and AS-6 to exhaust through conduits 430 and 432 through CV-2. Simultaneously, the bumper latch cylinders 210 are pressurized through conduits 431 and 433 pushing the bumper latches 200 out of the way and thus permitting the rail air spring legs 154, 156 to telescope. At the same time, air is vented from cylinder 244 through CV-2 allowing spring 260 to expand and pull cable 238 lifting the rail axle into the raised stored position. Flow control valve FV-1 has free flow in the exhaust direction.

When the highway air springs AS-1-4 have pushed their axles down to slightly below their riding level, valve MV-1 is released and by its spring action returns to its median or centered Run position. Control valve CV-3 remains in the Highway position, control valves CV-1 and CV-2 return to their centered position and control valve CV-1 closes off highway air springs AS-1,2,3,4 so that their level is now controlled by levelling valves LV-1 and LV-2, supplied with compressed air through conduits 414, 436, 438 and 440.

Coming now to that portion of the air schematic related to the braking functions, the vehicle air supply originates at the air couplings (glad hands) at the front of the vehicle which are connected either to the highway tractor, or on rails to the next vehicle forward and thence to the locomotive. When the manual valve MV-1 is moved to either the "Fill Highway" or "Fill Rail" position, in addition to the functions previously described, control valve CV-6, a pilot-operated, 2-position, 2-way valve is also operated through conduit 460 or 462, connecting the service (or signal) line to either the highway brakes or the rail brakes as the case may be. The inactive set of brakes will be vented to exhaust.

The highway braking system is conventional and shown generally in the area 446. It is operatively connected to the service (or signal) and emergency (or supply) lines 410 and 412 and comprises interconnected brake chambers B-1,2,3,4, tanks T-1,2,3, hoses, in-axle sensors (not shown) and ratio relay valves RRV-1, and modulating valves M-1,2 for skid control. Such trailer anti-skid braking systems are commercially available from many companies such as, for example, B. F. Goodrich Company of Troy, Ohio.

The rail braking system operates similarly to a highway trailer braking system, rather than to a conventional rail car braking system. The brake operating linkage is actuated by the brake chambers 262 which embody a service chamber and a spring brake chamber. As is well known in the art, in the service brake chamber air operates a diaphragm which pushes a piston and its connected rod and the linkage to the brakes thereby applying the brakes; and the spring brake chamber operates inversely in that air prevents the spring therein from applying the brakes.

The service brake is activated by compressed air from the locomotive independent brake line through the service or signal line 410 which causes the relay emergency valve REV-1 to permit compressed air from reservoir 444 to flow through conduit 456 through the valve REV-1, control valve CV-4 and conduits 448 and 450. Valve REV-1 is commercially available such as, for example, Model No. RE6 from Bendix Heavy Vehicles Group, Elyria, Ohio. Control valve CV-4 is a pressure reducing valve in which the pressure from the service outlet port of the Relay emergency valve REV-1 is modulated by pressure reaching CV-4 through conduit 434 which is equal to the pressure in air spring AS-6 which varies with the load being supported by AS-6. As the load on AS-6 increases, control valve CV-4 opens further allowing greater pressure to be supplied to the service brake chamber, thus making the braking force proportional to the load. The spring brake is rendered inoperative as long as compressed air from the reservoir is permitted to flow through conduits 452 and 454, thus preventing simultaneous application of the service brake and spring brake.

In a breakaway situation, when emergency line 412 is opened to atmosphere, the emergency feature of valve REV-1 applies the service brakes by allowing full reservoir pressure to flow to the service brake chambers. In the arrangement shown, this pressure is modulated by valve CV-4. The service brakes remain activated as long as pressure remains in the reservoir. Since this pressure leaks off gradually, in a parking situation valve CV-5 is manually operated to permit the spring brake chambers to be vented through valve CV-5. This valve CV-5 is a 2-position, 2-way, manually-operated, spring-returned valve which allows compressed air to flow from tank 444 to conduit 452 and 454 as long as it it in its normal position.

It will be understood that as used herein the term "rear sill structure" includes the central casting 60, the upper and lower plates 56 and 72, the channel member 68, the side rails 71, the diagonal braces 74 and 76, the vertical member 86 and the flange 92, as seen particularly in FIGS. 11 and 14. Also, the term "bogie" is used interchangeably herein with the rail wheel-set axle unit and includes the longitudinal castings 98 and 100, the transverse member 102 joining them, the tongue 96, the axle 32 and the railroad wheels 34 and miscellaneous parts.

Thus, it will be seen that an economically and operationally viable vehicle is provided which is readily and safely convertible from rail to highway mode of travel and vice versa; and skilled artisans may make variations without departing from the spirit of the invention.

What is claimed is:

1. A coupler to releasably connect vehicles end to end including a rear sill structure having a female slot opening therethrough, a male member extending from the front of a rear vehicle of lesser dimensions than said female slot and adapted to enter the slot of a forward vehicle, and means for releasably locking said male member in said female member, said releasable locking means including a vertical hole through said male member, a bushing in said vertical hole through said male member whose outer surface is spherical, and a spherical seat recessed in said rear sill structure upon which said male member rests to thereby provide limited rolling and pitching action between the coupled vehicles, a vertical locking pin, said spherical seat, said vertical hole and said vertical locking pin having the same vertical axis, and linkage means interconnected between said locking pin and said rear sill structure to selectively bias and extend said locking pin through said vertical hole to effect coupling and to retract said locking pin from said vertical hole to effect uncoupling.

2. The combination of claim 1 wherein said linkage means includes a link pivotally connected to said locking pin adjacent its lower end, a crank pivotally connected at its upper end to said link, and a shaft carried by the lower end of said crank and pivoted to said rear sill structure about an axis parallel to said link and crank pivots whereby to effect coupling while said male member is fully in said slot, rotation of said crank via its shaft in a counter-clockwise direction will cause said link to urge said locking pin vertically through said hole in said male member and reversing rotation of said crank will retract said locking pin from said vertical hole in said male member to effect uncoupling.

3. The combination of claim 1 wherein said linkage means includes a link pivotally connected to said locking pin adjacent its lower end, a bell crank including a pair of arms one of which is pivoted to said link, a shaft connected to the corner of said bell crank and pivoting it to said rear sill structure, a rod pivotally connected to the other arm of said bell crank, a bearing pivotally connected to a portion of said rear sill structure and slidably receiving the upper end of said rod and spring means urging said rod outwardly of said bearing whereby to effect coupling while said male member is fully in said slot, rotation of said bell crank via its shaft in a counter-clockwise direction will cause said link to urge said locking pin vertically through said hole in said male member, said spring acting to augment retention of said bell crank and link in the coupled position, and reverse rotation of said bell crank will retract said locking pin from said vertical hole in said male member to effect uncoupling.

4. A coupler to releasably connect vehicles end to end including a rear sill structure having a female slot opening therethrough, a male member extending from the front of a rear vehicle adapted to enter the slot of a forward vehicle, and means for releasably locking said male member in said female member, said releasable locking means including a vertical hole through said male member, a bushing in said vertical hole whose outer surface is spherical, and a spherical seat recessed in said rear sill structure upon which said male member rests to thereby provide limited rolling and pitching action between the coupled vehicles, a vertical locking pin, said spherical seat, said vertical holes and said vertical locking pin having the same vertical axis, and linkage means interconnected between said locking pin and said rear sill structure to selectively bias and extend said locking pin through said vertical hole to effect coupling and to retract said locking pin from said vertical hole to effect uncoupling, said linking means forming an over-center toggle.

* * * * *